(12) United States Patent
Ward et al.

(10) Patent No.: US 10,462,454 B2
(45) Date of Patent: *Oct. 29, 2019

(54) EXTENSIBLE AUTHORING AND PLAYBACK PLATFORM FOR COMPLEX VIRTUAL REALITY INTERACTIONS AND IMMERSIVE APPLICATIONS

(71) Applicant: Memory Engine Inc., San Carlos, CA (US)

(72) Inventors: Matthew E Ward, Philadelphia, PA (US); Jonathan Brill, Brooklyn, NY (US); Brian Chasalow, Brooklyn, NY (US)

(*) Notice: Subject to any disclaimer, the term of this patent is extended or adjusted under 35 U.S.C. 154(b) by 209 days.

This patent is subject to a terminal disclaimer.

(21) Appl. No.: 15/230,377

(22) Filed: Aug. 6, 2016

(65) Prior Publication Data

US 2016/0345003 A1 Nov. 24, 2016

Related U.S. Application Data

(63) Continuation of application No. 13/187,127, filed on Jul. 20, 2011, now Pat. No. 9,414,051.

(Continued)

(51) Int. Cl.
*H04N 13/04* (2006.01)
*H04N 7/18* (2006.01)
(Continued)

(52) U.S. Cl.
CPC ........... *H04N 13/366* (2018.05); *G01S 17/88* (2013.01); *G01S 17/89* (2013.01); *G06F 3/011* (2013.01);
(Continued)

(58) Field of Classification Search
CPC ........ G01S 17/89; G06F 3/011; G06F 3/0304; H04N 13/0468
See application file for complete search history.

(56) References Cited

U.S. PATENT DOCUMENTS 7,182,465 B2 2/2007 Fuchs et al.
7,593,024 B2 9/2009 Andrews et al.
(Continued)

FOREIGN PATENT DOCUMENTS

| CN | 1797474 A | 7/2006 |
| KR | 100808543 | 2/2008 |
| WO | 2013136333 | 9/2013 |

OTHER PUBLICATIONS

Anthony.Sebastian, "IllumiRoom peripheral projection: Is this the Xbox 720's killer feature?", 3 pages, Jan. 23, 2013, Retrieved Oct. 24, 2013, from http://www.extremetech.com/gaming/146536-illumiroom-peripheral-projection-is-this-the-xbox-720s-killer-feature; Video site: http://vimeo.com/71136799.

(Continued)

*Primary Examiner* — Md N Haque
(74) *Attorney, Agent, or Firm* — Schott, P.C.

(57) ABSTRACT

An immersive video system includes a display, a sensor that provides information about a user's location relative to the display, a projector capable of projecting images onto the user, and a processor in communication with the display, the sensor, and the projector. The processor manipulates the images projected onto the user based on user location data from the sensor.

9 Claims, 7 Drawing Sheets

Multi-user 3D User Interface

Related U.S. Application Data

(60) Provisional application No. 61/365,807, filed on Jul. 20, 2010.

(51) Int. Cl.
*H04N 13/366* (2018.01)
*G06F 3/01* (2006.01)
*G01S 17/88* (2006.01)
*G01S 17/89* (2006.01)
*G06F 3/03* (2006.01)
*H04N 9/31* (2006.01)

(52) U.S. Cl.
CPC .............. *G06F 3/012* (2013.01); *G06F 3/013* (2013.01); *G06F 3/0304* (2013.01); *H04N 7/183* (2013.01); *H04N 9/31* (2013.01)

(56) References Cited

U.S. PATENT DOCUMENTS

| | | | |
|---|---|---|---|
| 8,009,022 B2 | 8/2011 | Kipman et al. | |
| 8,213,680 B2 | 7/2012 | Fitzgibbon et al. | |
| 8,267,781 B2 | 9/2012 | Geiss | |
| 8,284,847 B2 | 10/2012 | Adermann | |
| 9,535,314 B2* | 1/2017 | Nelson | H04N 13/363 |
| 2003/0100965 A1* | 5/2003 | Sitrick | G09B 15/023 |
| | | | 700/83 |
| 2004/0027451 A1 | 2/2004 | Baker | |
| 2006/0109200 A1 | 5/2006 | Alden | |
| 2006/0279630 A1* | 12/2006 | Aggarwal | G01S 3/7864 |
| | | | 348/143 |
| 2007/0035561 A1 | 2/2007 | Bachelder et al. | |
| 2008/0030429 A1 | 2/2008 | Hailpern et al. | |
| 2008/0193043 A1 | 8/2008 | Wilson | |
| 2008/0225041 A1* | 9/2008 | El Dokor | G06F 3/011 |
| | | | 345/419 |
| 2009/0109175 A1 | 4/2009 | Fein et al. | |
| 2009/0232353 A1 | 9/2009 | Sundaresan et al. | |
| 2011/0004481 A1 | 1/2011 | Jones | |
| 2011/0107216 A1* | 5/2011 | Bi | G06F 3/011 |
| | | | 715/716 |
| 2011/0316853 A1 | 12/2011 | Bar-Zeev et al. | |
| 2012/0056989 A1 | 3/2012 | Izumi | |
| 2013/0009865 A1 | 1/2013 | Valik et al. | |
| 2013/0208899 A1 | 8/2013 | Vincent et al. | |
| 2015/0116199 A1* | 4/2015 | Yang | G09G 3/003 |
| | | | 345/156 |

OTHER PUBLICATIONS

Han, Jun Gong et al., "Enhanced Computer Vision with Microsoft Kinect Sensor: A Review", IEEE Transactions on Cyberkinetics, pp. 1-17, 2013.

Hsueh, Samuel, "Etron Stereoscopic Depth Map Camera", 2 pp., 2013, Retrieved Oct. 23, 2013, from http://www.etron.com/en/products/webcam_detial.php?Product_1D=20; Video site: http://youtu.be/BSXzuser3pc.

Korostelev, Michael, "Kinect Projection Mapping and Tracking Game", 1 page, Mar. 8, 2011, Retrieved Oct. 24, 2013, from http://thoth.eng.temple.edu/; Video site: http://www.youtube.com/watch?v=gs1 NKhi8MPQ.

Korostelev, Michael, "Immersive 30 Architectural Walkthrough + Kinect + Projection Mapping", 7 pages, Mar. 8, 2011, Retrieved Oct. 24, 2013, from http://waytoodigital.com/solutions/immersive-3d-walkthrough; Video site: http://www.youtube.com/watch?v=re1 EatGRVOw&feature=player_embedded; Related video: http://www.youtube.com/ watch?v=4V11V9Peqpc.

Nordahl, Rolf et al., "A multimodal architecture for simulating natural interactive walking in virtual environments", PsychNology Journal, vol. 9, No. 3, 245-268, 2011.

Xia, Lu et al., "Human Detection Using Depth Information by Kinect", pp. 15-22, date unknown, The University of Texas at Austin Department of Electrical and Computer Engineering, Retrieved Oct. 23, 2013, from http://www.nattee.net/sites/default/files/Human%20Detection%20Using%20Depth%201nformation%20by%20Kinect.pdf.

* cited by examiner

Figure #1    Multi-user 3D User Interface
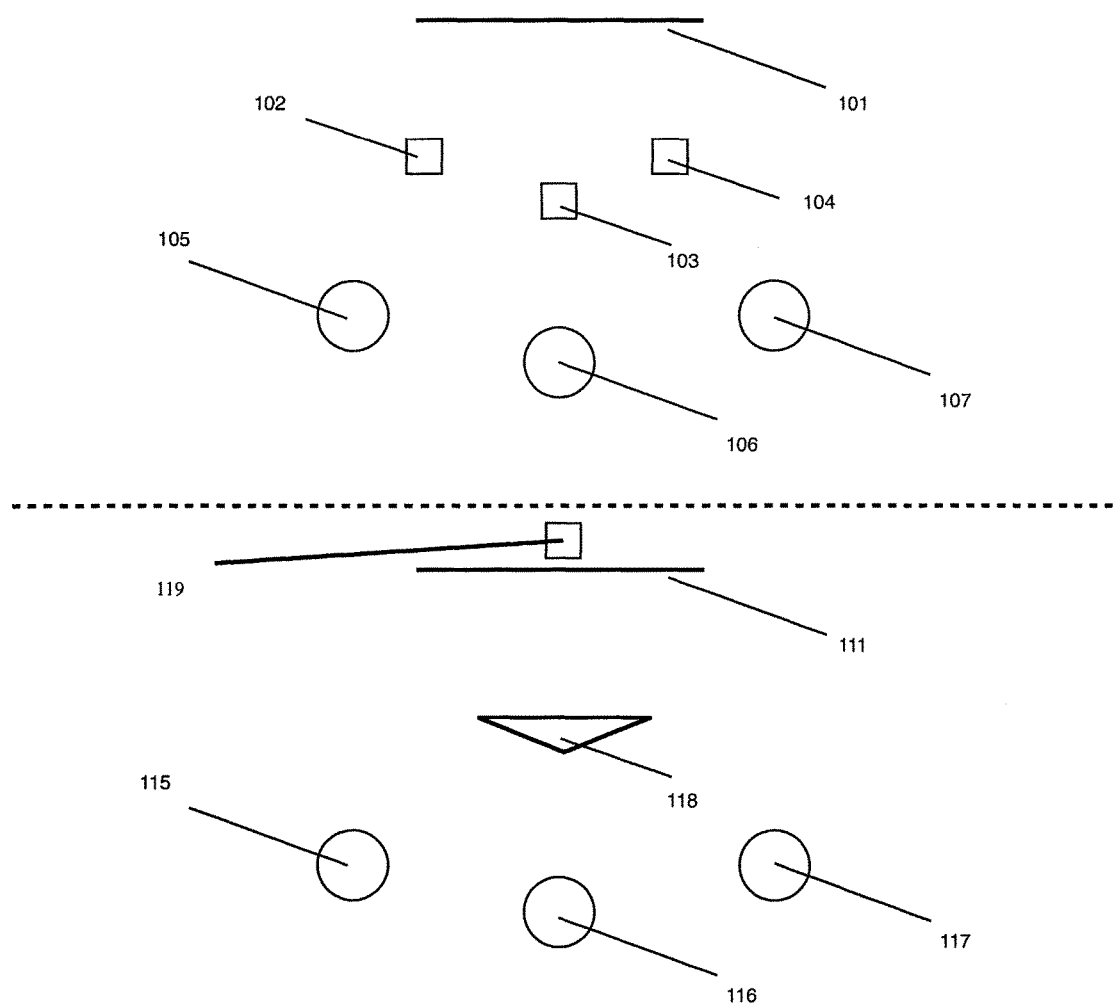

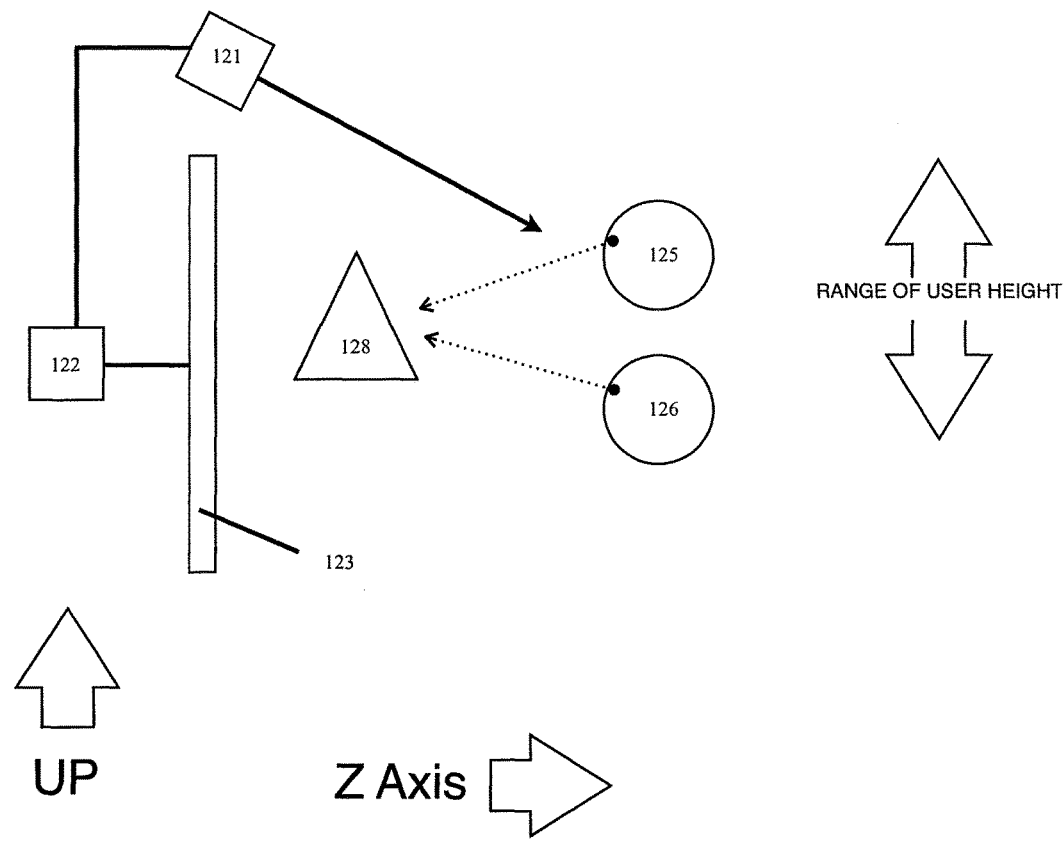
Figure #2    User Scaling

Figure #3    User Scaling - Skeleton
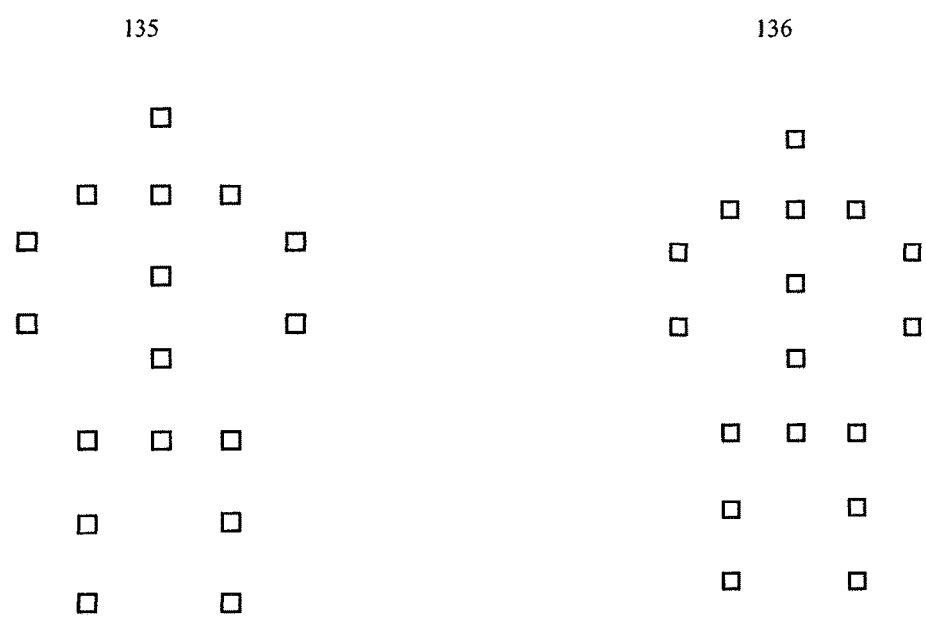

Figure #4    Sensor Mesh
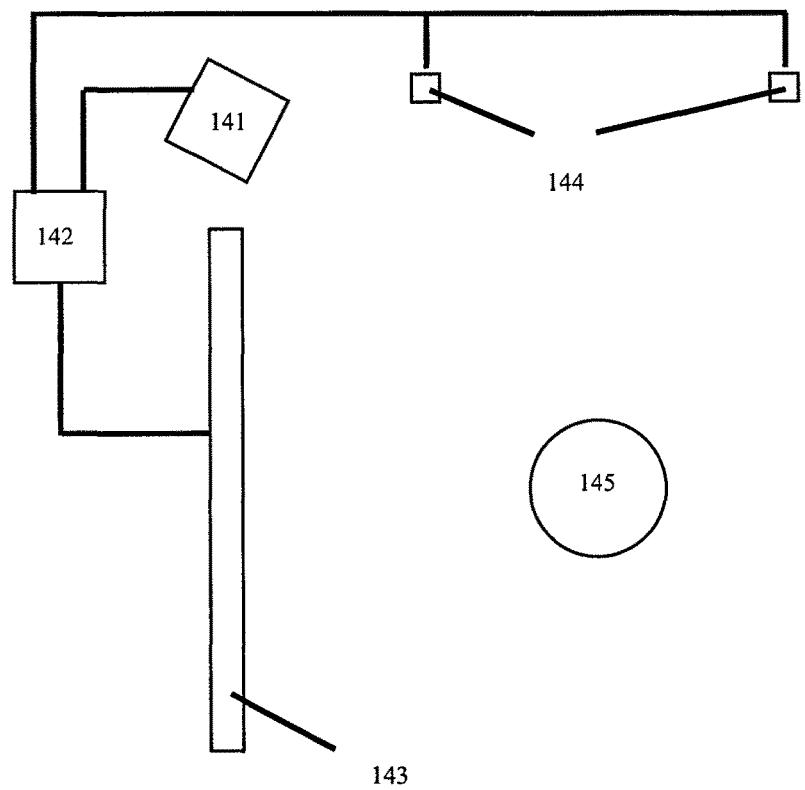

Figure #5    Feedback Mesh
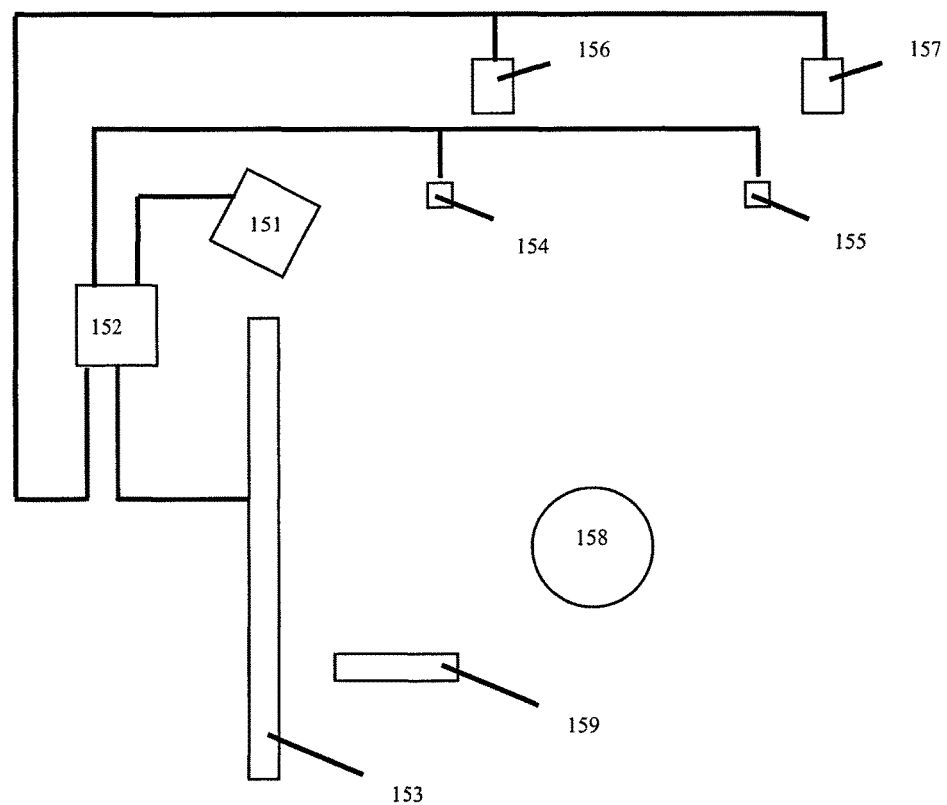

Figure #6    Spontaneous Navigation Tool
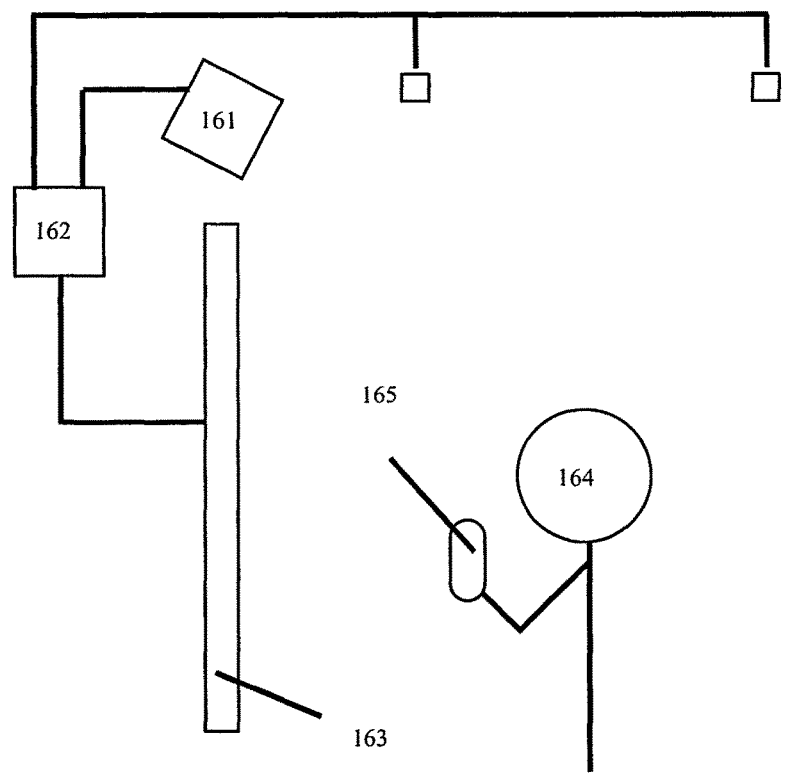

Figure #7   Virtual Camera
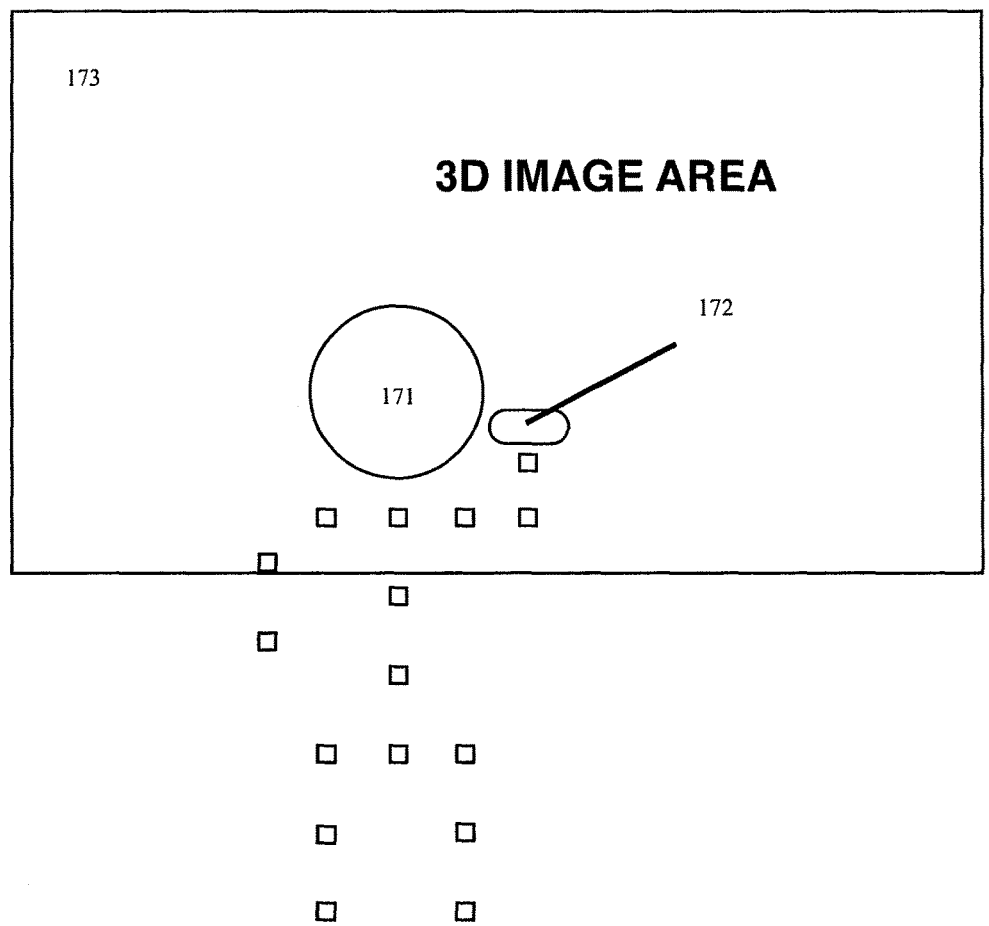

EXTENSIBLE AUTHORING AND PLAYBACK PLATFORM FOR COMPLEX VIRTUAL REALITY INTERACTIONS AND IMMERSIVE APPLICATIONS

FIELD OF INVENTION

This disclosure generally relates to sensor systems used as a component in interactive computer and entertainment system.

BACKGROUND

Immersive environments have been used extensively in product development, oil exploration, and academic environments. These environments often use simple hand tracking along with 3D visualization to understand human factors issues such as how a user interacts with a specific situation. These immersive environments allow users to see a design in something approximating a real world scale.

Interest in gesture-based Augmented Reality (AR) systems has increased significantly in the last few years with the arrival of the Nintendo Wii, the Apple iPhone, and the Xbox Natal/Kinect. These systems combine creative development tools, sensors, processors, user interfaces, media servers, and displays.

AR systems also usually include a camera and a display; although the function of the camera can vary. For example, in an application for controlling a car, the camera sees a card held in a user's hand and a 3D representation of a car is keyed onto the card. The card functions as a navigation tool and the car's movement corresponds to the card's movements. In another application, the camera shows the viewer a picture of a particular place, say a restaurant, with information, like a restaurant rating tag, superimposed over the place. Similar tagging may be used in video environments as well.

The commercialization of sensors along with the arrival of these different modes of interaction creates an opportunity to change the fixed relationships between individuals and their surroundings. Sensors in a hallway control light and temperature. Sensors in a phone tell a user they are close to a friend in a crowded train station. Sensors in a office detect a new document on a user's desk and search available resources for a digital version of the document and related information. The integration of these capabilities into features and functions that users will demand involves a complex set of actions involving hardware and software.

SUMMARY

An immersive video system includes a display, a sensor that provides information about a user's location relative to the display, a projector capable of projecting images onto the user, and a processor in communication with the display, the sensor, and the projector. The processor manipulates the images projected onto the user based on user location data from the sensor.

This disclosure relates a method for managing human factors in 3D virtual environments, a method for integrating a broad range of hardware and software technologies, a method for integrating sensing from a large range of sensors and filtering it into an extremely streamlined visual, auditory and kinesthetic experience and a method for authoring software and experiences of this sort.

Other aspects and advantages of the present disclosure will be apparent from the following descriptions and claims.

BRIEF DESCRIPTION OF THE DRAWINGS

FIG. 1 shows a multi-user 3D user interface.
FIG. 2 shows user scaling in a side view.
FIG. 3 shows a user scaling of a skeleton.
FIG. 4 shows a sensor mesh.
FIG. 5 shows feedback mesh.
FIG. 6 shows a spontaneous navigation tool.
FIG. 7 shows a virtual camera

DETAILED DESCRIPTION OF THE PREFERRED EMBODIMENTS

Introduction

——Creative Tools

Everything from a pad of paper to a computer-graphical-rendered farm can play a part in the development of an interactive experience. The interactive experience combines elements of cinematic, theater, visual, user interface design, sound design, haptic feedback, and lighting design.

In simple, linear predefined interactive experiences, where the user performs one task at a time, like a kiosk that sells train tickets or selecting a television station, it is common to create a modal interface. Modal interface elements only allow the user to perform one task at a time. Performing more complex or less structured tasks, like, for instance, painting a painting, may require an interface that comprises modal elements (in current WIMP (window, icon, menu, pointing) user interfaces, an example would be a popup window used to save a file), spring-loaded modes (in current WIMP user interfaces, an example would be the use of a shift key to type a capital letter) or a mode-less elements.

Just as it took a significant period of time, effort and innovation to rethink command line-based interfaces (like DOS) for the technical, cognitive and human factors of WIMP-based user interfaces, it will take significant insight to develop tools and user interface for a new interactive experience user interface paradigm, such as a 3D gestural interface.

Although there are tools available to perform various tasks, there are few tools available to seamlessly create a complicated interactive environment. Programs like Flash, Dreamweaver, Visual Studio and Maya may provide only limited solutions. For example, none of these have the ability to easily separate sets of actions that can be determined by a user from sets of actions that are controlled solely by the programmer. There are no programs that can easily place a user in a space and adjust the user's interaction based on the location and size of the user. Further, the user environment cannot be easily shared by multiple users wearing glasses since the UI elements may not be perceived to be in a common in XYZ space. For example, a user in this environment may push a slider in the 3D UI but to the viewer to the left the user's hand may not be on the slider that is moving based on the different 3D image they are receiving.

——Sensors 3D measurement in machine vision is generally handled by interferometry, time of flight, structured light, and stereo vision. The most popular sensors for gesture based and free form interactivity use some form of either time of flight sensing (ToF) or structured light. ToF sensors use the combination of an optical emitter and a optical sensor to measure the amount of time it takes for an emitted optical signal to be reflected back to the sensor along with software to process the information gathered by the sensor.

Some devices use a modulated light source which is measured by a synchronously gated imager. Photonic Mixer Device and Mesa Imaging are popular examples of this type of ToF device.

The LED light sources used in ToF sensors can be modulated by various means (Amplitude, Frequency, Width). Through modulating an LED it is possible to encode various forms of information varying from visible light for display applications to infrared light in communications applications.

The use of scanning light in sensor applications has been well-established in the construction industry and other industries. With scanning MEMS technology, it is easier to construct a scanning light source that has information in the X and Y axis. 2D and 3D imagers can read back the reflected light to establish a detailed image of a space.

Sensor systems, including gyroscopes and accelerometers, may also play a growing role in modern computing and entertainment.

——Processing

Sensor information gathered by the sensors is processed by the system as a point cloud or in some other manner so that the information is available in a usable format. This will vary based on the type of information gathered (cameras, proximity, motion, microphones, accelerometers, and so on). The sheer volume of data gathered can be an issue in some systems causing processing delays.

Processing also relates to the seamless integration of multiple sub systems. A system does not function unless the information coming from the sensors is successfully interpreted by software and used to generate certain predetermined outcomes. This is executed through various information display systems, user feedback systems, and more sensors.

For example, a sensor may identify a moving hand and direct another sensor to map that hand so that a particular response can be determined. The hand may touch a physical or perceived button triggering a sound. All of this may be handled in the processing section of the system.

——User Interfaces

A user interface is a system of sensors and other input devices (a common example is a computer mouse), analytic tools (like a mouse driver. Often, this would be external to an operating system, but is not necessarily the case), applications (for example, Microsoft Word) and sensory feedback that informs the user through output devices (a common example is a computer monitor) into a system in such a way that actions produce predictable outcomes.

The user interface may include automated functions such as facial recognition, object recognition, and other sets of conditional actions based on input from sensor networks.

Any means of navigation or interaction that has been provided to an operator or a user has been created in the development process and should be tied to one or more sensors in order to function. This can range from a physical interface (a button or a touch screen) to a perceived interface (a 3D navigation system that is perceived as existing outside of the display).

The commercial adoption of sensors has made it possible to incorporate sensors for light, sound, and motion (in the broadest possible sense). Light sensors can process visible and non visible light. Sound sensors (including anything that can sense vibration) can be integrated into a system. Motion sensors now provide a degree of information that allows for a high degree of precision in relative X, Y, Z space.

Developing a successful user interface is easiest in an area where the user has a high degree of familiarity. These high familiarity environmental interfaces may be called "natural user interfaces" and "free form gesture" environments.

But until the arrival of the Nintendo Wii, the majority of users have had little context in which to place these free form user interfaces. Cameras have been hooked up to personal computers and video game consoles for years and yet these have not developed into a successful input device. The Wii broke through this barrier by incorporating a hand held controller that incorporated an accelerometer and interacted relative to a sensor bar connected to the console.

Similarly the iPhone has also changed the way the average user interacts with displays. Given the right physical and visual cues, a person will step forward and touch a monitor in a public space with the expectation that this touch will trigger some sort of reaction by the monitor. This interaction was nearly unheard of just a decade ago.

The arrival of 3D has set the stage for what could be a revolutionary step forward in user interfaces, just like the Wii and the iPhone have moved expectations past the limited keyboard and mouse (or game controller) model.

As interfaces move from being tangible to being perceived and as the number of applications that users must learn grows, having a set of UI elements that are consistent among applications and interactions that work in a consistent order will become increasingly important.

——Media Server

For these systems to work, a computer or media server must be able to take the information processed by the system one moment and convert that into a properly delivered experience the next. The media server could have multiple video outputs, multiple audio outputs, multiple lighting outputs, multiple specialized device device, and multiple sensor outputs.

The media server may respond to certain actions by using analysis of input from one sensor and using that to decide what input and when to triggering or access specific sensors to get additional information. Although the primary sensors in a system operate constantly some sensors may only operate in a momentary or as needed basis. This helps manage system load.

——Display and Beyond

In order for the user to feel immersed in the experience, the displays in these new systems much match the capabilities of the sensors that drive them. The visual, aural, and physical must all interact in a way that can be fully integrated or homogenized by the user. This may be overcome through the careful selection of hardware from off the shelf sources however most vendors will not do this.

Current options revolve around the television or around a handheld device. These media systems can deliver some of the functionality but they fall short. It may be easier to get immersed in a handheld device held at the proper distance from the eyes than it is in an average home television.

These new environments will likely use video, High Resolution Light, illuminated indicators, sound, vibrating controllers, moving or tactile floors, and painted or projective walls to define the interaction space for the user. High Resolution Light is the boundary line between video projection and lighting. The arrival of pico projectors has created a path towards a commodity projector with enough resolution and light output that detailed information can be projected from a fixed position towards a defined surface.

Combine the pico projector with a dedicated sensor and a control network and a wide variety of uses become apparent.

Sound and vibration also play a part in this new environment. Directional sound can give a user important clues about what they need to do. Sound provides the confidence of a click when you press a real button. Vibration allows a user to sense that a phone is ringing when the sound is off.

The new immersive technology will not rely on controlling the viewer's viewing angle or the distance from the screen but it will instead rely on ubiquitous displays and the ability to give the user the ability to confidently and seamlessly control and interact with their audio visual environment.

DESCRIPTION OF THE FIGURES

FIG. 1 shows a multi-user 3D user interface for a typical multiple user scenario involving a 3D video display 101 and three users 105-107. If the center user 106 touches a button 103 visible on the display, when viewed by the left hand user 105, the button 102 appears to be over to the left and out of reach of the center user 106.

When viewed from the right side user 107, the button 104 appears to be to the right and out of reach of the center user 106. For the optimum level of interactivity to be created, all users 105-107 should have a common experience. A system optimized for one location may not function optimally in other locations and this optimization cannot be performed in a passive manner.

FIG. 1 below the dotted line illustrates a 3D video display 111 in front of three users 115-117. All three users 115-117 see a single object 118. If the user on the left side 115 departs, the object 118 is still common to the remaining two users 116, 117.

A Time-of-Flight (ToF) sensor 119 may determine the location of the users and can insure that a particular button is common to all the users present. For this system to function, the sensor 119 must be integrated with the display system 111 and the playback system in a relatively seamless manner.

The ToF sensor (or ToF camera) 119 may be a sensor that measures the time that it takes for an object, particle, acoustic, electromagnetic or other wave to travel a distance through a medium. This measurement can be used as a way to measure velocity or path length through a given medium, or as a way to learn about the particle or medium. The traveling object may be detected directly (e.g., ion detector in mass spectrometry) or indirectly (e.g., light scattered from an object in laser doppler velocimetry).

FIG. 2 illustrates a side view of additional features that may be added once the sensor system 121 is integrated with the playback system 122 and the display 123. In a 3D display, different users 125, 126 have different experiences. A taller user 125 will have a different experience than a shorter user 126. Each perceives an object 128 to be in a different place. Given the importance of relative location in the X, Y, Z space to navigation in a 3D user interface the system needs to understand and make use of user height and user distance in the layout of the system.

FIG. 3 shows two different mapped skeletons 135, 136 extracted by the aforementioned ToF sensor 119. The skeleton on the left 135 is larger than the skeleton on the right 136 in all ways. When the user on the right 136 steps up to a system featuring a 3D display 123, a ToF sensor 119, and a suitable software suite, the user's interactivity is tailored to the individual's skeleton by moving and scaling icons and customizing the features of other interactive environments.

FIG. 4 shows the use of controlling and other sensors. ToF sensors 141 and other higher resolution sensors 144 generate more data about the environment and user 145. Monitoring each sensor at all times could provide too much data, so sometimes, not all sensors are monitored.

The sensor 141 is connected to a processor 142 that drives the display 143. As with all the displays mentioned herein, the display could be a 2D display, a 3D display, or an auto-stereoscopic 3D display. The system also receives and transmits information from additional sensors 144. These additional sensors 144 can be cameras looking a visible or non-visible light. They can also be microphones or any other sensor that can provide information appropriate for the interaction taking place. The primary ToF camera 141 captures the XYZ coordinate data for a user 145. The user 145's actions cause the system to record additional data. For example, perhaps one of the user's hands is behind them (thus the arm portion of the skeleton is missing its arm) or an action in the program or game being run calls for more detail on the exact position of the hand, for example imagine the user 145 needs to open a door in game. The system can look at the supplemental sensors 144 and find the information that is required while not processing data from other sensors with information that is not required at this moment (for example, information regarding the user 145's knees may not be important to opening a door).

The system can also take advantage of information sources not typically used by ToF cameras such as the shadow generated by the IR emitter on the ToF camera.

In another embodiment, a sensor mesh may comprise multiple ToF sensors/cameras that operate using synchronized light sources or share a common remote light source. The use of multiple ToF cameras introduces other opportunities that increase the accuracy and functionality of systems.

Some vision systems used in gesture mapping rely on large amounts of information gathered by a single sensor. 3D video projection systems may use circular polarizers and can be used to create discreet right and left channels. The system herein, in contrast, may be applied to ToF vision system in order to increase the amount of information available to the processor and a binocular system increases the ability of a 3D vision system to handle occlusions. In Motion Capture (MOCAP) systems, reference points are applied to moving models in order to create a wireframe that can be used in a post production environment. There are a finite number of reference points attached to a model and this generates a manageable amount of information.

Moreover, in the case of faces, additional actions can be taken including a head mounted camera that records and interprets muscle movements.

The system may incorporate the capabilities of a stereoscopic or 2D TOF camera system and combine with a more limited number of reference points that yield a system that is fast and that produces reproducible results.

FIG. 5 expands on the capabilities of FIG. 4. The sensor 151 is connected to a processor 152 that drives the display 153. The processor 152 also receives data from a network of sensors 154,155. These sensors can provide precise information about the user 158 in the space. There are also video supplemental projectors 156, 157 (two are shown but more are possible). The video projectors can function as a high resolution lighting source. In use, for example, the ToF sensor 151 can determine that a user 158 is coming close to a button 159. As the user 158 approaches the button 159, the ToF sensor 151 asks one of the supplemental sensors 156 for detailed information in order to map the user's hand.

Once mapped, the user 158's hand (or any part of the user or object that the user is holding or wearing) may be used as a projection surface such that the user 158's mapped information can be used by the processor 152 to send a projected color from the feedback projectors 156 to project onto the user. In use, the user 158 sees the color fade up on their hand as they approach the button 159, adding to the illusion that the user 158 is approaching the button 159. The projected color matches the color of the button 159 and, as the user presses the button 159, the color may change to give the impression of movement. This gives the user 158 a high sense of confidence as they are navigation the space.

Stated in another example, imagine that in the immersive environment, the user 158 approaches a yellow school bus. As the user 158 approaches the school bus, the supplemental projectors 156, 157, based on commands received from the processor 152 that is using the sensor 151 to map the user 158, projects a reflective yellow from the bus onto the user 158.

Using the user's body or an object that user holds or wears as a projection surface could also add to in-character immersion. For example, the processor could project blue onto the user's skeleton body to simulate the user being a Na'Vi from the Avatar movie, or make subtle color changes to reflect different clothing. Or in another example, if the user 158 holds a cylinder, the cylinder could be colored grey as sword, brown as a club, or grey with green as a sword dipped in acid. Similarly, a mapped cylinder in the user's hands might be projected grey as a sword and white-colored during movement to emphasize the object's movement through the immersive environment.

It is possible that the interaction designer may want to light the user's hands in a subtle way from the application's start to make the appearance of light on the user's hand less obvious. This could be integrated into a tracking aura that might be generated in the 3D video so that they can track the precise location of their hands in the virtual 3D space.

FIG. 6 illustrates the use of an object 165 as a navigational tool. The system can query the user 164 about the object 165. The sensor 161 may note the presence of an object in a user's hand or the interaction designer may provide one in the space. The object could be a model plane. The ToF sensor 161 provides information about the object 165 such as location, velocity, acceleration, size, color, etc.

The object 165 could be a smart phone, or a controller that mimics a camera. The smart phone 165 could be integrated into the interactive experience and the user 164 could even have preloaded software on the phone. In this case, the phone 165 becomes a part of the interaction providing information from the accelerometer, camera, gyroscope, and display. Programming the system so that the user 164 can have a highly integrated experience and then leave with a portion of that experience can be a very powerful tool.

FIG. 7 demonstrates on extension of the capabilities disclosed above. If the user has installed the smart phone version of the application, then the user 171 can user their smart phone 172 to take a picture of the 3D image 173. Using the navigation techniques the user can choose specific angles while setting up the shot. And then hold their phone in position and take a picture using the same interface they are accustomed to using on their smart phone.

In use, for example, a vendor may be showing off an object rendered as a 2D or 3D image 173 like a large manufacturing item like an airplane turbine, boat, luxury accommodation, vacation destination, etc. The interested user 171 may approach the image 173 and tour it, using their smart phone 172 (or controller acting like a phone or camera), and capture 2D or 3D images for later viewing and consideration. This allows the user 171 to capture views of interest to the user instead of those pre-selected in a brochure or walking tour.

The system showing the image and the smart phone 172 may communicate over a local wireless network. After taking a photo, the phone 172 may locally (or network store) the image so that the user can return to it later. The system may also be able to track what users took what pictures so that the information can be used by the interaction designer/vendor to track what features user's find interesting. This can allow the vendor to increase details in those aspects of the item shown or let the vendor know those features that user's find interesting.

If the user does not have a smart phone, they can use their phone or any spontaneous navigation tool as a proxy for the camera. That user would need to provide personal information so that the pictures can be accessed via a web site or sent via electronic mail. The system could also use text messaging to give the user a unique download code.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. An immersive video system comprising:
   a first sensor that provides information about a user's location;
   a projector that projects images onto the user;
   a processor in communication with the sensor, and the projector, wherein information about the user's location is used by the processor to generate a map regarding the user's location; and
   a second sensor that tracks the user's eye movements;
   wherein the processor manipulates the images projected onto the user based on user location data from the first sensor and eye movements from the second sensor;
   wherein the processor directs the projector to project based on the user's eye movements.

2. The immersive video system of claim 1, wherein the second sensor tracks a user's facial movements.

3. The immersive video system of claim 1, further comprising a stereoscopic display and a camera, wherein the user engages the camera to take a photograph of the stereoscopic display.

4. The immersive video system of claim 3, wherein the stereoscopic display may be photographed from different angles.

5. The immersive video system of claim 1, further comprising an entertainment engine in communication with the processor, wherein the processor manipulates the images projected onto the user based on data from the entertainment engine.

6. The immersive video system of claim 1, wherein the first sensor provides a skeleton map for a user to the processor.

7. The immersive video system of claim 1, wherein the first sensor is a time of flight sensor.

8. The immersive video system of claim 1, further comprising multiple displays.

9. The immersive video system of claim 1, further comprising multiple channels of sound.

* * * * *